United States Patent [19]

Shivers, Jr. et al.

[11] 4,335,493

[45] Jun. 22, 1982

[54] CUTTING TOOTH EXTRACTOR FOR STUMP CUTTING AND DIGGING APPARATUSES

[76] Inventors: Norman E. Shivers, Jr.; David E. Shivers, both of 121 W. El Segundo, Los Angeles, Calif. 90061; Paul N. Shivers, 79 Patrician Way, Apt. 3D, Pasadena, Calif. 91105

[21] Appl. No.: 146,063

[22] Filed: May 2, 1980

[51] Int. Cl.[3] .............................................. B23P 19/04

[52] U.S. Cl. ....................................................... 29/254

[58] Field of Search ................. 29/244, 254, 255, 256, 29/257, 261, 262, 265, 278, 283; 294/103 R; 269/249

[56] References Cited

U.S. PATENT DOCUMENTS

| | | | |
|---|---|---|---|
| 2,548,401 | 4/1951 | Sherwood | 294/103 |
| 2,779,089 | 1/1957 | Allen | 29/254 |
| 4,074,899 | 2/1978 | Hochstetler | 269/249 |

*Primary Examiner*—Robert C. Watson

*Attorney, Agent, or Firm*—Frank Frisenda, Jr.

[57] ABSTRACT

An extractor for in situ removal of stump cutting teeth from a cutting wheel. The extractor includes a clamping device having a c-shaped frame with an elongated base member especially adapted to receive and then retain a downwardly stepped land disposed on a head portion of a cutting tooth. The clamping device is mounted on a slide hammer which when activated exerts a sharp pulling force on the head portion of the tooth to efficiently remove the tooth from the cutting wheel without distorting the original shape of the tooth.

9 Claims, 4 Drawing Figures

CUTTING TOOTH EXTRACTOR FOR STUMP CUTTING AND DIGGING APPARATUSES

BACKGROUND OF THE INVENTION

This invention relates to an extractor for in situ removal of stump cutting teeth from a cutting wheel.

Stump cutting and digging devices generally employing a rotatable cutter disc having a plurality of removably mounted cutting teeth or bits have been and continue to be recognized by those skilled in the art as an extremely efficient means for effecting land clearing tasks.

One such device is disclosed in U.S. Pat. No. 4,074,447 issued on Feb. 21, 1978 to Norman E. Shivers, Jr. et al., the instant inventors, for "Stump Cutting and Precision Digging Apparatus." Another stump remover device utilizing such cutting teeth is disclosed in U.S. Pat. No. 3,935,887 issued on Feb. 3, 1976 to Van Zante et al. for "Cutter Disc."

In operation, the rotating cutting wheel with associated components including cutting teeth and clamp elements are harshly exposed to wood chips, sawdust, dirt and the like which eventually become lodged in small crevices of, for instance, the cutting tooth clamps. Further, over time, the occurence of rust on the components associated with the cutting wheel is not uncommon.

As a result of the above mentioned conditions, often times, the generally removeable cutting tooth will become lodged in the clamping element, making extraction of the tooth a relatively tedious and time-consuming process.

One conventional method of extracting a lodged tooth from its mounting clamp has been to utilize a hammer and chisel to strike the rear end of the cutting tooth shank in an attempt to move the tooth forward through the clamp mounting. This, unfortunately, can result in flaring of the tooth end, which can cause the tooth to be inextricably fixed in its mounting.

Hence, those concerned with the efficient operation and maintenance of stump cutting and digging devices employing a rotatable cutting wheel with removeable cutting teeth mounted thereon, have expressed a need for a device capable of in situ removal of the cutting teeth from the wheel in a relatively quick and simple manner and one which does not distort the original shape of the cutting tooth. The present invention fulfills this need.

SUMMARY OF THE INVENTION

The present invention provides an extractor for in situ removal of cutting teeth from a cutting wheel, which can be used to quickly and easily dislodge cutting teeth from as associated mounting element. The extractor includes a forwardly mounted clamping device comprising a screw threaded through an upper member of a c-shaped frame, the frame having an elongated base member especially adapted to receive and then retain a head portion with a downwardly stepped land of a cutting tooth. The clamping device is mounted on a slide hammer which, when manually activated, exerts a sharp pulling action for efficient removal of the tooth from its mounting element, but does not distort the original shape of the cutting tooth.

More specifically, in a presently preferred embodiment of the invention, the elongated base member of the clamping device terminates in an upstanding leg of suitable configuration and sufficient height to conform with and abut substantially the entire adjacent face of the downwardly stepped land when the cutting tooth head is inserted and clamped in the frame of the device. In this respect, the upstanding leg of the clamping device is preferably composed of a heat treated steel to provide a hardened surface which will resist cracking or marring when contact is made with the stepped land of the cutting tooth head.

The clamping device of the invention may further preferably comprise a screw of the socket head cap screw type to provide for easy insertion and removal of a wrench to draw the lower end portion of the screw into clamping engagement with the top surface of a suitably positioned cutting tooth head in the clamping device. In yet another preferred embodiment, the screw of the inventive clamping device may comprise a swivel finger at its lower end portion to prevent wandering of the engaged tooth head surface when clamped in the device.

Other features and advantages of the present invention will become apparent from the following detailed description, taken in conjunction with the accompanying drawings, which illustrate, by way of example, the principles of the invention.

DESCRIPTION OF THE PREFERRED EMBODIMENTS

Figure 1:
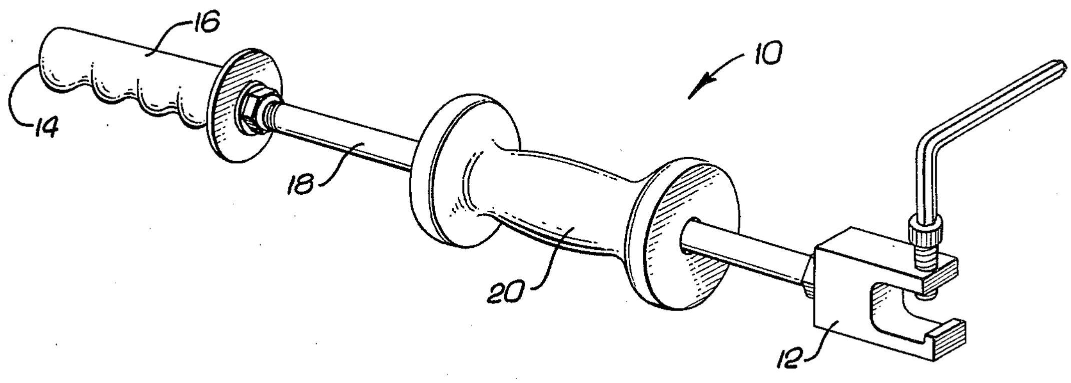
FIG. 1 is a perspective view of an extractor for in situ rem6val of stump cutting teeth ɪrom a cutting wheel embodying the present inventipn.

As shown in the exemplary drawings, an extractor for in situ removal of stump cutting teeth from a cutting wheel, indicated generally by reference numeral 10 in FIG. 1, is provided for clamping the head portion of a cutting tooth. The extractor 10 comprises a unique clamping device 12 which is mounted on a forward portion of a slide hammer 14. Optionally, the clamping device 12 may be associated with a removably attached wrench to readily secure the clamping device to the head portion of a stump cutting tooth.

The slide hammer 14 conventionally comprises a handle 16, removably attached to an elongated rod 18 positioned through a bore disposed in a sliding weight 20. The slide hammer of the type depicted is commercially available from suppliers such as Proto Professional Tools, Fullerton, Calif.

Figure 2:
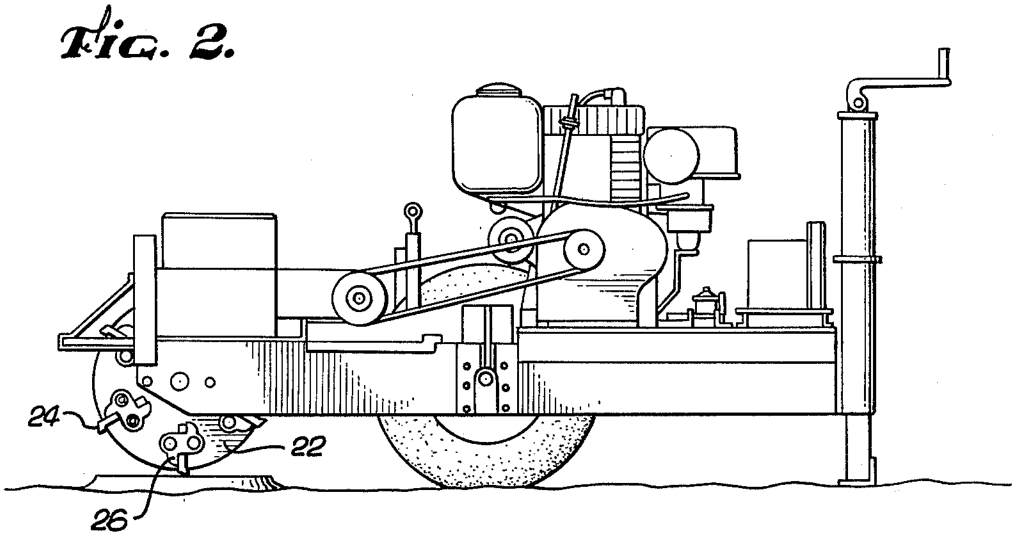
FIG. 2 is a side elevational view of a stump cutting, earth digging apparatus of the type generally having a rotatable cutting wheel with a plurality of removably mounted cutting teeth or bits.

Illustrated in FIG. 2 is a stump cutting and earth digging device, generally employing a rotatable cutter disc 22, having a plurality of removably mounted cutter teeth 24, which are held by clamp elements 26. The stump cutting device includes a frame member on which an engine, fuel tank, and battery are appropriately positioned to provide for rotational driving of the cutter wheel 22. Further disclosure regarding the stump cutting and digging device may be had by reference to U.S. Pat. No. 4,074,447, which is hereby incorporated by this reference.

Figure 3:
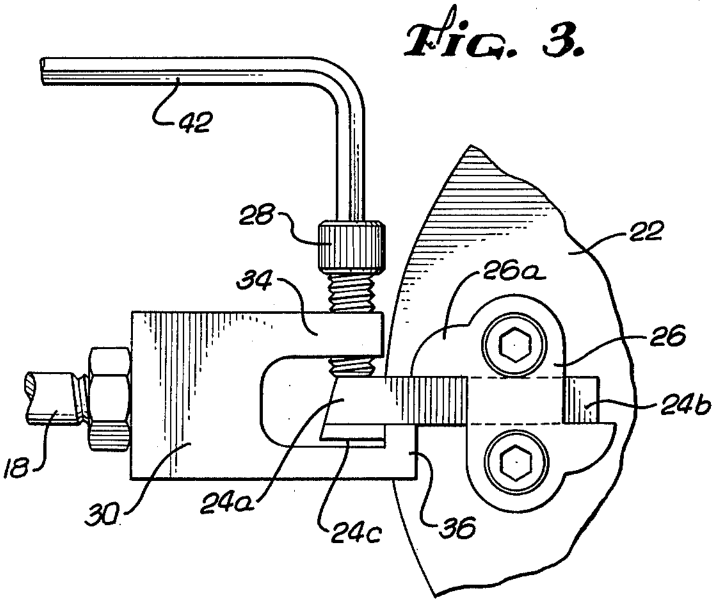
FIG. 3 is an enlarged fragmentary side view of a cutting tooth removably secured on a portion of the cutting wheel by mounting means, the tooth being suitably positioned in a clamping device of the inventive cutting tooth extractor.

In more detail, and with reference to FIG. 3, the inventive clamping device 12 comprises a screw 28 threaded through an upper portion of a c-shaped frame 30, the frame 30 having an elongated base member 32 especially adaped to receive and then retain a head portion 24*a* of a cutting tooth 24. In this respect, the head portion 24*a* includes a downwardly stepped land 24*c* which is composed of a material relatively harder than the remainder of the tooth.

Such stump cutting teeth are commercially available from suppliers such as Vermeer Manufacturing Company of Pella, Iowa, in a range of sizes, most typically a $\frac{1}{2}$ inch square shank. The teeth are available with a square or round head portion and may be oriented at 45° angles, left and right, relative to the planar surface of the cutting wheel 22. Of course, straight teeth are also available as the tooth depicted in FIG. 3.

The cutting wheel of stump cutting and digging devices may include from about 9 to about 50 pairs of stump cutting teeth which are removably mounted on the cutting wheel by adjustable clamp elements 26. To position a tooth within the element 26, pocket bolts 38 are loosened, and tooth shank 24*b* is inserted into the pocket of element 26. Typically the pocket has from about 0.006 inches to about 0.008 inches clearance after insertion of the tooth shank 24*b*. Thereafter, bolts 38 are tightened to retain the cutting tooth 24 in the desired position.

More specifically, the C-shaped frame includes an elongated base member 32 terminating in an upstanding leg 36 of sufficient height to abut substantially the entire adjacent face 24*c* of the downwardly stepped land of the tooth head 24*a*, when the head is suitably positioned in frame 30. Typically, for a $\frac{1}{2}$ inch square tooth shank, the height of the upstanding leg 36 will range from about $\frac{1}{8}$ of an inch to about $\frac{1}{4}$ inch. Of course, those skilled in the art will readily appreciate that the height and contour of the mating surface of the upstanding leg 36 may be widely varied to conform with the adjacent face of the downwardly stepped land to provide for complete abutment therewith.

The upstanding leg 36 of the elongated base member 32 is preferably composed of a tempered steel to provide a hardened mating surface which will resist cracking or marring when contact is made with downwardly stepped land of the cutting tooth 24. In this respect, a Rockwell hardness in the range of from about 32 to about 40 has been determined to provide the best characteristics for the upstanding leg 36.

Referring again to FIG. 3, the opposing upper member 34 of the C-shaped frame 30 is preferably relatively shorter than the elongated base member 32. This design is particularly beneficial for manipulating the clamping device close to protruding portion 26*a* of element 26.

The screw 28 may be of the socket head cap screw type to provide for easy insertion and removal of a wrench 42. When the screw 28 is drawn down into clamping engagement with the upper surface of a suitably positioned cutting tooth head 24*a* in the frame 30, the entire adjacent face of the land 24*c* will preferably be engaged by the mating surface of upstanding leg 36. It is to be understood that while the mating surface of the upstanding leg 36 depicted in FIG. 3 is flat to conform with the stepped land of a square tooth head, the mating surface of leg 36 may be concave (FIG. 4) to conform with a downwardly stepped land of a round tooth head, and/or may be appropriately sloped depending upon the shape of the tooth head to be extracted from a mounting element.

Figure 4:
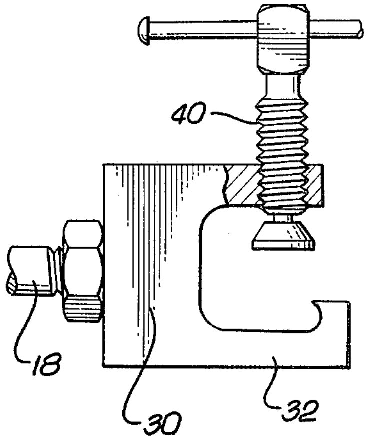
FIG. 4 is a fragmentary side view of the cutting tooth extractor illustrating a second embodied clamping device of the present invention having an upstanding leg with concave mating surface to conform with a downwardly stepped land of a round cutting tooth head.

FIG. 4 is yet another embodiment of the invention illustrating a clamping device with a screw 40 provided with a swivel finger at its lower end portion to prevent wandering of engaged surfaces when the tooth head surface is clamped in the device 12. Screws suitable for use in constructing the clamping devices of the invention are commercially available from McMaster-Carr Supply Company of Los Angeles, Calif. for instance, having about $\frac{1}{2}$ inch width and from about 1 inch to about 3 inches long.

In a preferred mode of operation, the user of the tooth extractor 10 grasps handle 16 of the slide hammer 14 to position the clamping device 12 having screw 28 in an elevated position. The device 12 is positioned in such a manner as to catch the adjacent surface of the land 24*c*, for instance a steel carbide insert, of tooth head 34A with the conforming mating surface of upstanding leg 36. The screw 28 is thereafter tightened by use of wrench 42 so that the lower end portion of screw 28 abuts the top surface of the cutting tooth head 24 A. Accordingly, the user then grasps sliding weight 20 of the hammer 14 to slide the weight back and forth to exert a sharp abutment with stops provided on slide rod 18. Several sharp back and forth motions of the sliding weight 20 dislodges the tooth 34 quickly and easily from its mounting element 26, even when such teeth are lodged in the pocket by wood chips, saw dust, dirt and the like.

Thus, the present invention provides an efficient method and device for removal of stump cutting teeth without having to remove the cutting wheel 22 from the stump cutter device or without having to remove pocket elements 26 from the cutter wheel 22.

The tooth extractor of the present invention is capable of in situ removal of cutting teeth from the cutting wheel in a relatively quick and simple manner and without substantially distorting the original shape of the cutting tooth.

Various changes coming within the spirit and scope of this invention may suggest themselves to those skilled in the art. Hence, this invention is not to be limited by specific embodiments shown and described or uses mentioned, except to the extent of the scope of the appended claims.

We claim:

1. An extractor for in situ removal of a stump cutting tooth removably mounted on a cutting wheel, said tooth having a head portion with a downwardly stepped land, the extractor comprising:
   - a slide hammer; and
   - a clamping device forwardly mounted on said slide hammer, said device including a screw, and a c-shaped frame having an open ended upper member opposed to an elongated base member, said upper member being provided with a threaded aperture to receive said screw and arranged to cooperate with a top surface of said head portion of said cutting tooth when inserted in said c-shaped frame; said elongated base member terminating in an upstanding leg of mating configuration and of sufficient height to substantially abut the entire adjacent face of said downwardly stepped land when said cutting tooth head portion is inserted in said c-shaped frame and said screw is drawn down to engage the top surface of said head portion of said cutting tooth; said upstanding leg of said elongated base being composed of a material having a Rockwell hardness in the range of from about 32 to about 40 which is relatively harder than the remainder of said c-shaped frame; wherein when said downwardly stepped land of said cutting tooth is clamped in said device, said slide hammer, when activated, exerts a sharp pulling force on said head portion of said cutting tooth to efficiently remove said tooth from the cutting wheel without distorting the original shape of said tooth.

2. The extractor as defined in claim 1 wherein the surface of said upstanding leg which abuts said adjacent face of said downwardly stepped land is contoured to correspond and mate with said adjacent face.

3. The extractor as defined in claim 2 wherein the surface of said upstanding leg which abuts said adjacent face is flat.

4. The extractor as defined in claim 2 wherein the surface of said upstanding leg which abuts said adjacent face is concaved.

5. The extractor as defined in claim 1 wherein said upstanding leg is composed of a tempered steel and said remainder of said c-shaped frame is untempered steel.

6. The extractor as defined in claim 1 wherein said screw is a socket head cap screw.

7. The extractor as defined in claim 1 wherein said screw comprises a swivel finger at its lower end portion.

8. The extractor as defined in claim 1 wherein the height of said upstanding leg is within a range of from about $\frac{1}{8}$th of an inch to about $\frac{1}{4}$ of an inch.

9. The extractor as defined in claim 1 wherein said upper member of said c-shaped frame is relatively shorter than said elongated base member.

* * * * *